United States Patent
Bianconi

(10) Patent No.: US 9,384,374 B2
(45) Date of Patent: Jul. 5, 2016

(54) USER INTERFACE FACILITATING SPECIFICATION OF A DESIRED DATA FORMAT FOR AN INDICIA READING APPARATUS

(71) Applicant: Hand Held Products, Inc., Fort Mill, SC (US)

(72) Inventor: Thomas Bianconi, Aurora, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 388 days.

(21) Appl. No.: 13/803,106

(22) Filed: Mar. 14, 2013

(65) Prior Publication Data

US 2014/0282210 A1     Sep. 18, 2014

(51) Int. Cl.
  *G06F 3/0486*  (2013.01)
  *G06K 7/01*  (2006.01)

(52) U.S. Cl.
  CPC ............... *G06K 7/01* (2013.01); *G06F 3/0486* (2013.01)

(58) Field of Classification Search
  CPC .............................. G06F 3/048; G06F 3/0486
  USPC ........................................................ 715/780
  See application file for complete search history.

(56) References Cited

U.S. PATENT DOCUMENTS

| | | | | |
|---|---|---|---|---|
| 5,544,287 A * | 8/1996 | Roth | ...................... | G06K 1/121 358/1.1 |
| 5,885,012 A * | 3/1999 | Hastings | ................ | B41J 3/4075 101/288 |
| 6,712,268 B1 * | 3/2004 | Mason | .............. | G06F 17/30879 235/380 |
| 7,039,647 B2 | 5/2006 | Lowe et al. | | |
| 7,104,456 B2 | 9/2006 | Parker et al. | | |
| 7,934,660 B2 | 5/2011 | Yeakley et al. | | |
| 8,296,332 B2 | 10/2012 | Boley et al. | | |
| 8,302,865 B2 * | 11/2012 | Gelay | ................ | G06K 7/10554 235/454 |
| 2003/0011628 A1 * | 1/2003 | Piatek | ................... | G06F 1/1626 715/700 |
| 2008/0235263 A1 * | 9/2008 | Riaz | ....................... | G06F 17/243 |
| 2010/0149187 A1 * | 6/2010 | Slavin | ...................... | G06K 1/12 345/441 |
| 2012/0048939 A1 | 3/2012 | Fiutak et al. | | |
| 2012/0210268 A1 * | 8/2012 | Hilbrink | ............... | G06F 3/0484 715/773 |
| 2012/0248197 A1 | 10/2012 | Soule, III et al. | | |
| 2012/0313953 A1 | 12/2012 | Owen et al. | | |
| 2013/0193208 A1 * | 8/2013 | Collins | .............. | G06K 7/10821 235/440 |

OTHER PUBLICATIONS

Motorola Solutions, "123Scan2 Data Formatting (ADF) Rule (3 of 3)", uploaded Aug. 12, 2011, https://www.youtube.com/watch?v=5Q8AfF5m3Z8.*

(Continued)

*Primary Examiner* — Reza Nabi
*Assistant Examiner* — Daniel Rodriguez
(74) *Attorney, Agent, or Firm* — Additon, Higgins, & Pendleton, P.A.

(57) ABSTRACT

Aspects describe herein facilitate specification of a desired data format for bar code data to be presented by an indicia reading apparatus. Bar code data decoded from an image of a bar code is obtained and displayed. A user input field is provided and based on input by the user to the user input field, the user input field is populated with a representation of the desired data format for the bar code data. Based on the representation of the desired data format populated in the user input field, configuration settings are determined for configuring the indicia reading apparatus to present bar code data in the desired data format.

17 Claims, 7 Drawing Sheets

(56) References Cited

OTHER PUBLICATIONS

Tutorialspoint.com, "Move Text—Microsoft Word 2010", Nov. 3, 2011, http://www.tutorialspoint.com/word_2010/word_move_text.htm.*

Barcodesinc.com, "Wasp WDI4500 Scanner", May 4, 2012, http://www.barcodesinc.com/wasp/wdi4500.htm.*

Data Formatting, Honeywell Area Imaging-Scanner User's Guide, http://www.honeywellaidc.com/CatalogDocuments/Xenon-UG%20Rev%20G.pdf, December, day unknown, 2012, Chapter 6, pp. 1-20.

* cited by examiner

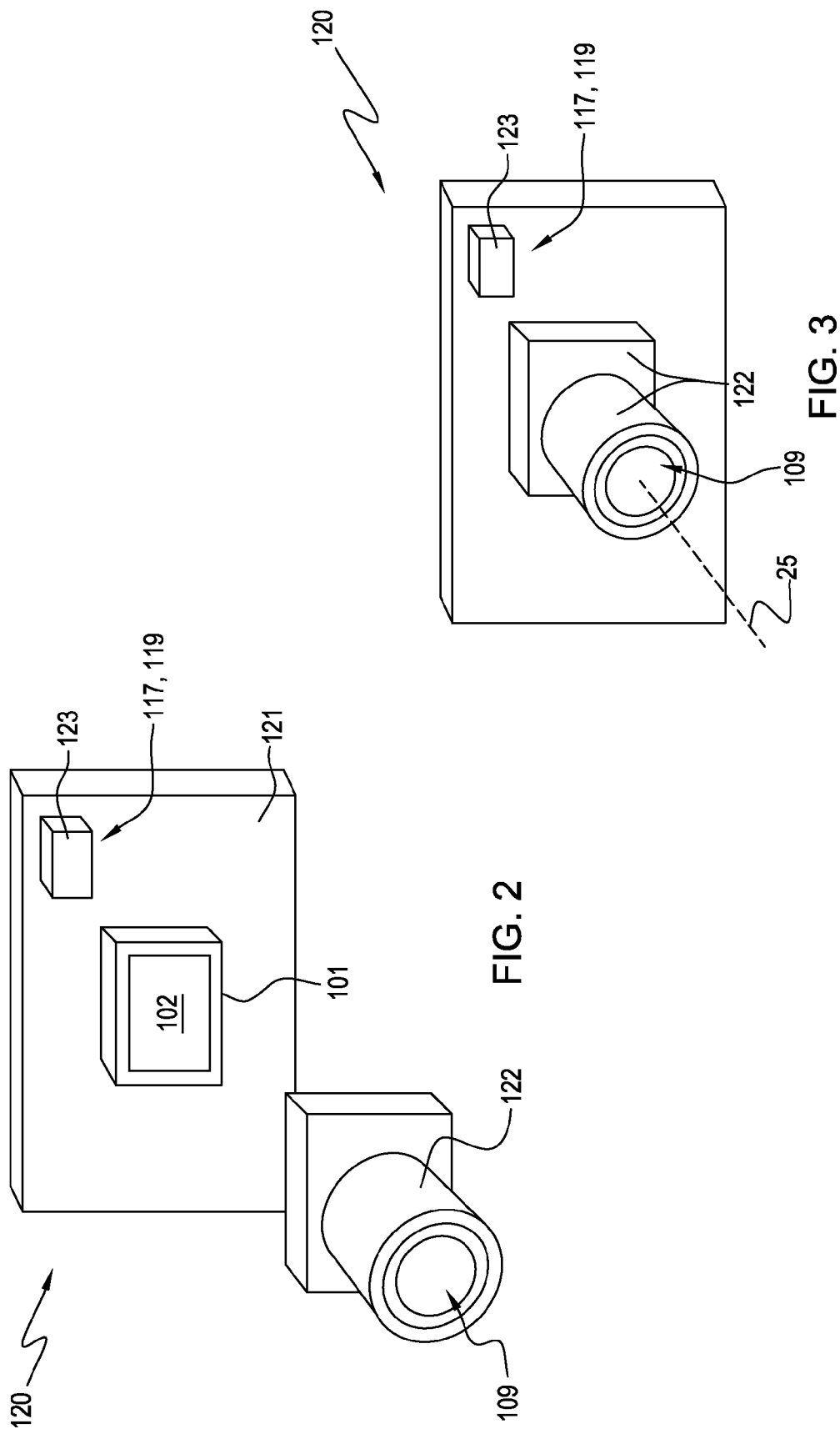

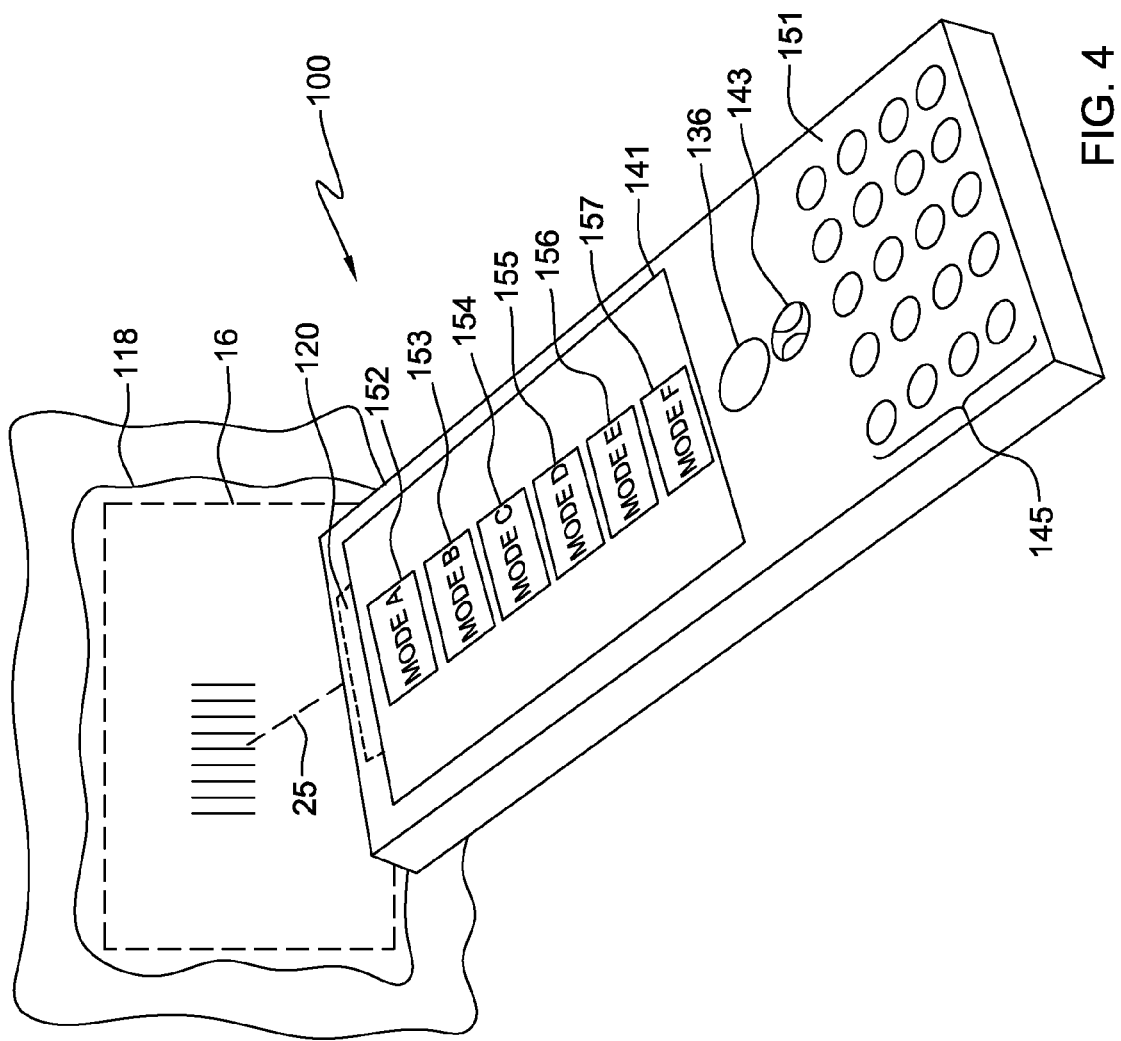

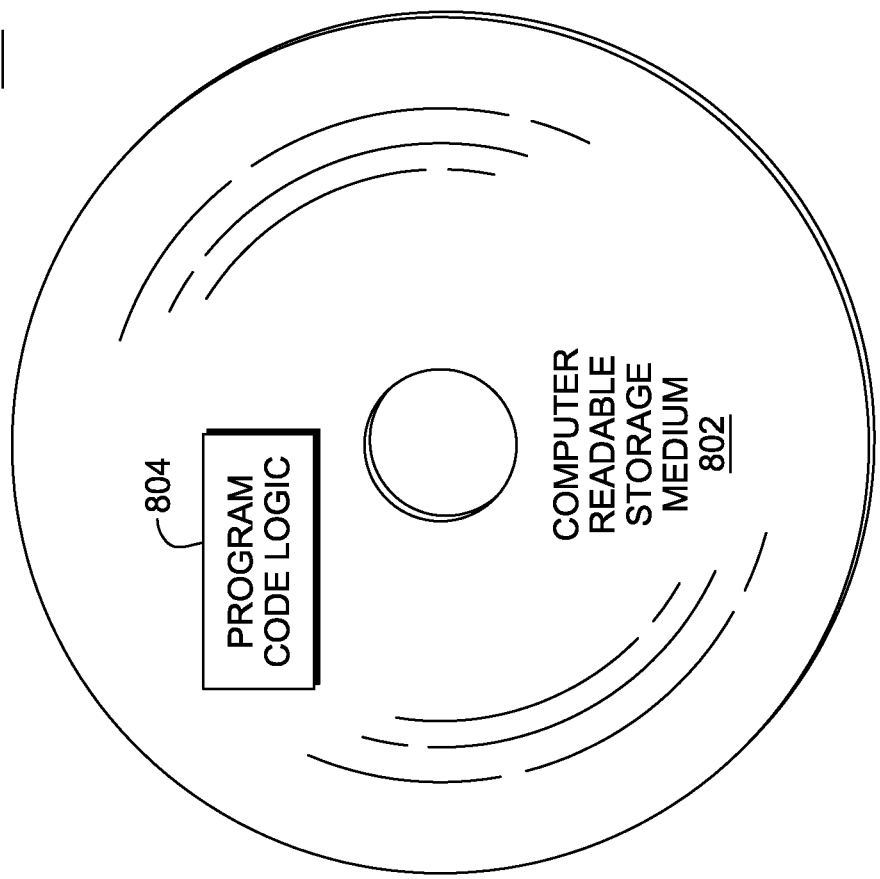

USER INTERFACE FACILITATING SPECIFICATION OF A DESIRED DATA FORMAT FOR AN INDICIA READING APPARATUS

FIELD OF THE INVENTION

This invention relates to indicia reading apparatuses, and more specifically to configuration thereof to present data in a desired data format.

BACKGROUND OF THE INVENTION

When bar codes or other indicia are decoded, the resulting data is usually formatted according to a prescribed format. Data formatting in this context refers to the post-decode manipulation of the data. Often, the data is formatted according to how a receiving application expects the data to be provided to it. Indicia reading apparatuses, such as bar code readers, offer differing levels of data formatting capability. Manufacturers sometimes provide utilities for end users to configure the apparatus to format data in a desired format. However, enhanced formatting capability can cause problems for end users unfamiliar with the technical aspects involved in configuring the apparatus. Since data formatting can be complicated and difficult to explain to end users, often times a manufacturer's support team (such as tech support, solution architects, etc.) is burdened with the task of configuring the indicia reading apparatus for the end-user (e.g. a customer).

SUMMARY OF THE INVENTION

The shortcomings of the prior art are overcome and additional advantages are provided through a method for providing a graphical user interface, the graphical user interface facilitating specification, by a user, of a desired data format for bar code data to be presented by an indicia reading apparatus. The providing includes obtaining and displaying bar code data, the bar code data decoded from an image of a bar code; providing a user input field, wherein based on input by the user to the user input field, the user input field is populated with a representation of the desired data format for the bar code data, wherein the representation comprises at least a portion of the displayed bar code data; and based on the representation of the desired data format populated in the user input field, determining, by a processor, one or more configuration settings for configuring the indicia reading apparatus to present bar code data in the desired data format.

Systems and computer program products relating to one or more aspects are also described and claimed herein.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts an exploded assembly perspective view of an imaging module;

FIG. 3 depicts a perspective view of an imaging module;

FIG. 4 is a schematic physical form view of an indicia reading apparatus for use in connection with aspects described herein;

FIG. 8 depicts one example of a computer program product to incorporate one or more aspects described herein.

DETAILED DESCRIPTION OF THE INVENTION

Aspects described herein relate to provision of a graphical user interface (GUI) application to facilitate specification of a desired data format for formatting data. The GUI application facilitates manipulation, by a user, of data itself, whereby the user's manipulation defines the data formatting to be performed on decoded data, for instance data decoded by an indicia reading apparatus just prior to presenting the data (e.g. to another device or for display on the indicia reading apparatus). Indicia reading apparatuses are ubiquitous in retail, healthcare, transportation/warehouse, manufacturing, and many other sectors.

The GUI application could, in some embodiments, be used as a standalone application for specifying the desired data format and for configuring the indicia reading apparatus to present data formatted in the desired data format. Additionally or alternatively, the GUI application could be integrated into an existing configuration tool for configuring the indicia reading apparatus, or as a separate software plug-in to another program, as examples.

Figure 1:
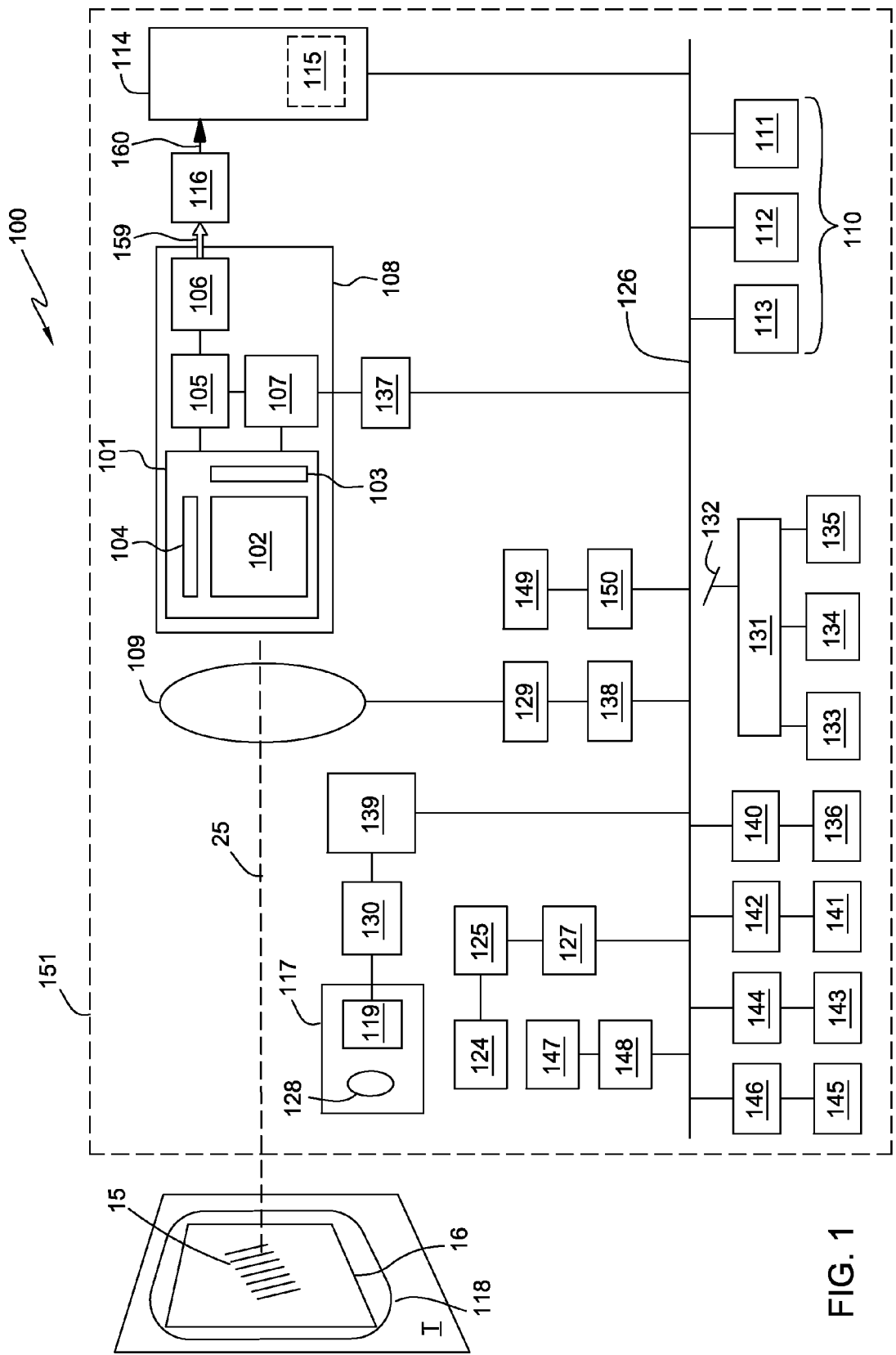
FIG. 1 depicts a block diagram of one embodiment of an indicia reading apparatus for use in connection with aspects described herein.

FIG. 1 depicts a block diagram of one embodiment of an indicia reading apparatus for use in connection with aspects described herein. In one example, the indicia reading apparatus is a component of a point-of-sale system, or is used in connection with a health care provider's maintenance of patient data and/or health care service processes, as examples. For convenience, an indicia reading apparatus may be referred to herein as an 'indicia reading terminal', or simply a 'terminal' or 'scanner'.

Referring to FIG. 1, indicia reading apparatus/terminal 100 includes an image sensor 101 comprising a multiple pixel image sensor array 102 having pixels arranged in rows and columns of pixels, along with associated column circuitry 103 and row circuitry 104. Associated with image sensor 101 is amplifier circuitry 105 (amplifier), and an analog-to-digital converter 106 which converts image information in the form of analog signals read out of image sensor array 102 into image information in the form of digital signals. Image sensor 101 also has an associated timing and control circuit 107 for use in controlling e.g., the exposure period of image sensor 101, and gain applied to amplifier 105. The noted circuit components 101, 105, 106, and 107 are packaged into a common image sensor integrated circuit 108. Image sensor integrated circuit 108 can, in some embodiments, incorporate fewer than the noted number of components or additional components as would be appreciated by those having ordinary skill in the art. For instance, analog-to-digital converter 106 may, in one example, reside separate from image sensor integrated circuit 108. In one example, image sensor integrated circuit 108 is provided by an MT9V022 (752×480 pixel array), an MT9V023 (752×480 pixel array), or an MT9M114 (1296×976 pixel array) image sensor integrated circuit available from Micron Technology, Inc. In another example, image sensor integrated circuit 108 is provided by an EV76C454 Jade family CMOS sensor (838×640) available from e2v Technologies plc, Chelmsford, England. In one example, image sensor array 102 is a monochrome sensor array, a color image sensor array, or a hybrid monochrome and color image sensor array having a first subset of monochrome pixels without color filter elements and a second subset of color pixels having color sensitive filter elements. In one example, image sensor integrated circuit 108 incorporates a Bayer pattern filter, so that defined at image sensor array 102 are red pixels at red pixel positions, green pixels at green pixel positions, and blue pixels at blue pixel positions. In the example of an image sensor array incorporating a Bayer pattern filter, frames that are provided can include red pixel values at red pixel positions, green pixel values at green pixel positions, and blue pixel values at blue pixel positions. Further in an embodiment incorporating a Bayer pattern image sensor array, CPU 115, described in further detail below, can, prior to subjecting a frame to further processing, interpolate pixel values at frame pixel positions intermediate of green pixel positions utilizing green pixel values for development of a monochrome frame of image data. Alternatively, CPU 115 can, prior to subjecting a frame for further processing, interpolate pixel values intermediate of red pixel positions utilizing red pixel values for development of a monochrome frame of image data. CPU 115 can, alternatively, prior to subjecting a frame for further processing, interpolate pixel values intermediate of blue pixel positions utilizing blue pixel values.

An imaging subsystem of apparatus 100 includes image sensor 101 and, optionally, a lens assembly 109 for focusing an image onto image sensor array 102 of image sensor 101. As noted above, lens assembly 109 is optional, and, in cases where cost minimization is of paramount importance, can be omitted.

In the course of operation of apparatus 100, image signals are read out of image sensor 101, and optionally converted and stored into, for instance, a system memory such as RAM 111. A memory 110 of apparatus 100 includes RAM 111, a nonvolatile memory such as EPROM 112 and a storage memory device 113 such as may be provided by a flash memory or a hard drive memory. Apparatus 100 includes a microprocessor integrated circuit 114 that includes CPU 115 which can be adapted to read out image data stored in memory 110 and subject such image data to various image processing algorithms.

Apparatus 100 can also include an image data binarization circuit 116 for binarizing image data read out from image sensor integrated circuit 108 and providing a binarized signal to microprocessor integrated circuit 114 for, e.g., further processing and/or storage in RAM 111, as is explained in further detail below. Image data binarization circuit 116 receives image data by way of bus 159 and provides a binarized signal to microprocessor integrated circuit 114 by way of signal line 160.

Referring to further aspects of apparatus 100, imaging lens assembly 109, if present, can be adapted for focusing an image of decodable indicia 15 located within a field of view 16 on a substrate, T, onto image sensor array 102. A size in target space of a field of view 16 of apparatus 100 can be varied in a number of alternative ways. A size in target space of a field of view 16 can be varied, e.g., by changing a terminal-to-target distance, changing an imaging lens assembly setting, and/or changing a number of pixels of image sensor array 102 that are subject to read out. Imaging light rays can be transmitted about imaging axis 25. Lens assembly 109 can be adapted to be capable of multiple focal lengths and multiple planes of optimum focus (best focus distances), if desired.

Apparatus 100 includes an illumination subsystem 117 of varying complexity for illumination of target, T, and projection of an illumination pattern 118. Illumination pattern 118, in the embodiment shown, can be projected to be proximate to, but larger than, an area defined by field of view 16, and/or can also be projected in an area smaller than an area defined by a field of view 16. Illumination subsystem 117 includes a light source bank 119, comprising one or more light sources. A physical form view of an example of an illumination subsystem is shown in FIGS. 2 and 3. As shown in FIGS. 2 and 3, an imaging module 120 is provided having a circuit board 121 carrying image sensor 101 and optional lens assembly 109 disposed in support 122 disposed on circuit board 121. In the embodiment of FIGS. 2 and 3, illumination subsystem 117 has a light source bank 119 provided by single light source 123. In another embodiment, light source bank 119 can be provided by more than one light source. In one particular embodiment, illumination subsystem 117 comprises a light-emitting diode.

Referring back to FIG. 1, apparatus 100 can optionally include an aiming subsystem 124 for projecting an aiming pattern (not shown). Aiming subsystem 124, which can comprise a light source bank, is coupled to aiming light source bank power input unit 125 for providing electrical power to a light source bank of aiming subsystem 124. Power input unit 125 is coupled to system bus 126 via interface 127 for communication with other components of apparatus 100, such as microprocessor integrated circuit 114 and/or CPU 115 thereof.

In one embodiment, illumination subsystem 117 includes, in addition to light source bank 119, an illumination lens assembly 128, as is shown in the embodiment of FIG. 1. In addition to, or in place of, illumination lens assembly 128, illumination subsystem 117 can include alternative light shaping optics, e.g. one or more diffusers, mirrors and prisms.

In use, apparatus 100 can be oriented by an operator with respect to a target, T, (e.g., a piece of paper, a package, another type of substrate) bearing decodable indicia 15 in such manner that illumination pattern 118 is projected on decodable indicia 15. In the example of FIG. 1, decodable indicia 15 are provided by a 1D bar code symbol. Decodable indicia 15 could also be provided by any other form of bar code, such as a 2D bar code symbol, or optical character recognition (OCR) characters, as examples.

Referring to further aspects of apparatus 100, lens assembly 109, if present, is controlled with use of electrical power input unit 129 which provides energy for changing a plane of optimum focus of lens assembly 109. In one embodiment, an electrical power input unit 129 operates as a controlled voltage source, and in another embodiment, as a controlled current source. Electrical power input unit 129 applies signals for changing optical characteristics of lens assembly 109, e.g., for changing a focal length and/or a best focus distance of (a plane of optimum focus of) lens assembly 109. Light source bank electrical power input unit 130 provides energy to light source bank 119. In one embodiment, electrical power input unit 130 operates as a controlled voltage source. In another embodiment, electrical power input unit 130 operates as a controlled current source. In another embodiment electrical power input unit 130 operates as a combined controlled voltage and controlled current source. Electrical power input unit 130 can change a level of electrical power provided to (energization level of) light source bank 119, e.g., for changing a level of illumination output by light source bank 119 of illumination subsystem 117 for generating illumination pattern 118.

In another aspect, apparatus 100 includes power supply 131 that supplies power to a power grid 132 to which electrical components of apparatus 100 can be connected. Power supply 131 is coupled to various power sources, e.g., a battery 133, a serial interface 134 (e.g., USB, RS232), and/or AC/DC transformer 135.

Further regarding power input unit 130, power input unit 130 includes a charging capacitor that is continually charged by power supply 131. Power input unit 130 is configured to output energy within a range of energization levels. An average energization level of illumination subsystem 117 during exposure periods with the first illumination and exposure control configuration active can be higher than an average energization level of illumination and exposure control configuration active.

Apparatus 100 also optionally includes a number of peripheral devices including trigger 136 which may be used to make active a trigger signal for activating frame readout and/or certain decoding processes. Apparatus 100 can be adapted so that activation of trigger 136 activates a trigger signal and initiates a decode attempt. Specifically, apparatus 100 can be operative so that, in response to activation of a trigger signal, a succession of frames can be captured by way of read out image information from image sensor array 102 (typically, though not always, in the form of analog signals) and then storage of the image information after binarization and conversion into memory 110 (which can buffer one or more of the succession of frames at a given time). Microprocessor integrated circuit 114 can be operative to subject one or more of the succession of frames to a decode attempt, for instance by CPU 115 of microprocessor integrated circuit 114.

In attempting to decode a bar code symbol, e.g., a one dimensional bar code symbol, microprocessor integrated circuit 114 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. In one particular embodiment, CPU 115 of microprocessor integrated circuit 114 performs such processing of image data. Where a decodable indicia representation is a 2D bar code symbology, a decode attempt can include locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Apparatus 100 can include various interface circuits for coupling various of the peripheral devices to system address/data bus (system bus) 126, for communication with microprocessor integrated circuit 114, which is also coupled to system bus 126. Apparatus 100 includes interface circuit 137 for coupling image sensor timing and control circuit 107 to system bus 126, interface circuit 138 for coupling electrical power input unit 129 to system bus 126, interface circuit 139 for coupling illumination light source bank power input unit 130 to system bus 126, and interface circuit 140 for coupling trigger 136 to system bus 126. Apparatus 100 also includes a display 141 coupled to system bus 126 and in communication with microprocessor integrated circuit 114 (for instance CPU 115 thereof), via interface 142, as well as pointer mechanism 143 in communication with microprocessor integrated circuit 114 (for instance CPU 115 thereof) via interface 144 connected to system bus 126. Apparatus 100 can additionally include keyboard 145 coupled to system bus 126 via interface 146. Apparatus 100 also includes range detector unit 147 coupled to system bus 126 via interface 148. In one embodiment, range detector unit 147 can be an acoustic range detector unit.

Apparatus 100 additionally includes an accelerometer 149 which is coupled to system bus 126 for communication across bus 126 with microprocessor integrated circuit 114, and/or CPU 115 thereof, via interface 150. Apparatus 100 monitors an output of accelerometer 149 for determining a measure of motion of apparatus 100. Apparatus 100 also compares pixel values of successive frames for determining a measure of motion of apparatus 100 (with an increase in motion the pixel values of corresponding pixel positions of successive frames can be expected to increase).

Various interface circuits of apparatus 100 can share circuit components. For example, a common microcontroller can be established for providing control inputs to both image sensor timing and control circuit 107 and to power input unit 130. A common microcontroller providing control inputs to circuit 107 and to power input unit 130 can be provided to coordinate timing between image sensor array controls and illumination subsystem controls.

A succession of frames of image data that can be captured and subject to the described processing can be full frames (including pixel values corresponding to each pixel of image sensor array 102 or a maximum number of pixels read out from image sensor array 102 during operation of apparatus 100). A succession of frames of image data that can be captured and subject to the described processing can also be "windowed frames" comprising pixel values corresponding to less than a full frame of pixels of image sensor array 102. A succession of frames of image data that can be captured and subject to the described processing can also comprise a combination of full frames and windowed frames. A full frame can be read out for capture by selectively addressing pixels of image sensor 101 having image sensor array 102 corresponding to the full frame. A windowed frame can be read out for capture by selectively addressing pixels of image sensor 101 having image sensor array 102 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Apparatus 100 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of apparatus 100 can be increased (and frame time decreased) by decreasing a frame picture size.

Further aspects of apparatus 100 in one embodiment are described with reference to FIG. 4. Trigger 136, display 141, pointer mechanism 143, and keyboard 145 are disposed on a common side of a hand held housing 151 as shown in FIG. 4. Display 141 and pointer mechanism 143 in combination can be regarded as a user interface of apparatus 100. Display 141 in one embodiment incorporates a touch panel for navigation and virtual actuator selection in which case a user interface of apparatus 100 is provided by display 141. A user interface of apparatus 100 can also be provided by configuring apparatus 100 to be operative to be reprogrammed by decoding of programming bar code symbols. Apparatus 100 can be operative so that user-selectable modes of operation are selectable with use of displayed actuators 152, 153, . . . , 157, or with use of programming bar code symbols. A hand held housing 151 for apparatus 100 can, in another embodiment, be devoid of a display and/or keyboard and can be in a gun style form factor. Additionally, imaging module 120, including image sensor array 102 and imaging lens assembly 109 can be incorporated in hand held housing 151 (also depicted in FIG. 1).

The indicia reading apparatus of FIG. 1 is provided by way of example only. Many other indicia reading terminals having greater or fewer components/capabilities may be used in connection with aspects described herein. Example such indicia reading apparatuses are the Xenon™ 1900, Xenon™1902, VuQuest® 3310g, and Genesis™ 7580 products offered by Honeywell Scanning and Mobility, Fort Mill, S.C., USA.

In typical operation of an indicia reading apparatus, such as a bar code scanner, a trigger is activated that causes the scanner to image and decode a bar code. The decoded data—"raw" bar code data—is then held in a buffer until it is presented, for instance until it is sent from the scanner across an interface to a recipient. Typical interface types include Universal Serial Bus (USB), serial RS-232, or any other wired or wireless interface type.

Instead of sending raw bar code data across the interface, it is sometimes desired to manipulate that data in order to format it for a host application that receives the data after it is sent through the interface. By way of specific example, a host application might be a point-of-sale application installed on a data processing system, and the scanner might be a bar code scanner connected to the data processing system across a USB interface. The point-of-sale application might expect that bar code data be provided to the application in a particular format, and that format might differ from the format of the raw bar code data after it is decoded. As a simple example, the bar code data might be "1234", and a user's point of sale application may expect only a three-character input. The user may therefore wish that the last character be stripped from the bar code, so that it is sent as "123".

Because the desired data formatting might vary among different users, applications, environments, etc., the terminal manufacturer can specify a command set that includes commands available for issuance to the terminal to configure the terminal to format data in a particular manner before presenting that data. Using the example above, a command might be available that configures the terminal to format the raw data by dropping the last character before displaying the (formatted) data or providing that formatted data to another component, such as a host data processing system.

Though these commands can be specified to end-users of the terminal in an owner's manual or other documentation, thus enabling the users themselves to configure the terminals, data formatting can be too complicated a task for the end users to handle themselves. They sometimes resort to calling manufacturer's technical support team, putting excess demands on the technical support resources. For terminal manufacturers, distributers, and end users, an efficient and convenient facility for formatting data is desired. Ease of use of the configuration features would address a common technical support issue, avoiding the need to dedicate additional resources to fielding support requests from end users seeking assistance in configuring their terminal to format data to a desired data format.

According to aspects described herein, a graphical user interface application is provided to facilitate specification of a desired data format. An example such graphical user interface is described with reference to FIG. 5. In one example, the graphical user interface is provided by a program executing on a data processing system in communication with an indicia reading apparatus. In other examples the graphical user interface might execute on the terminal itself, being presented on a display thereof to a user.

Figure 5:
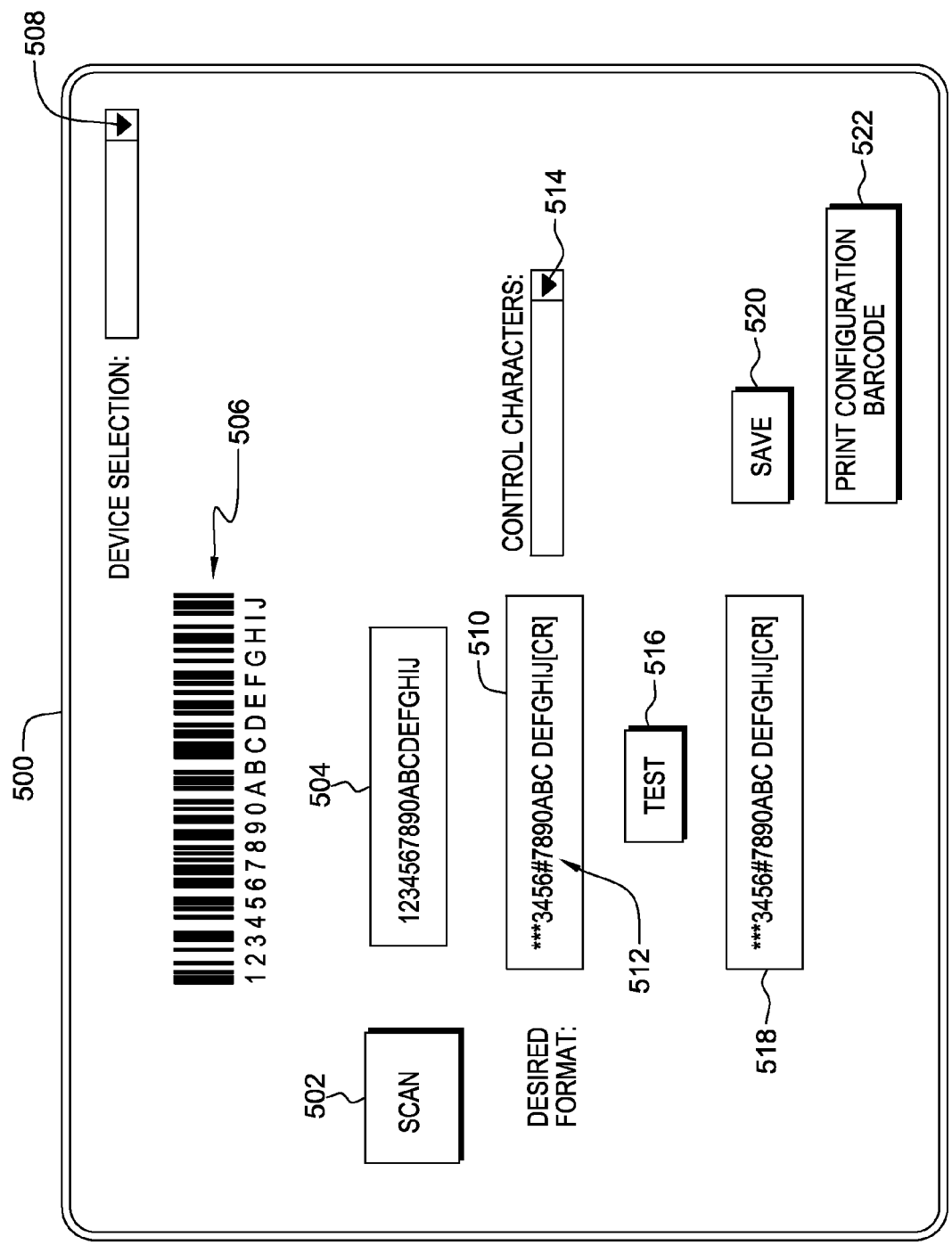
FIG. 5 depicts one example of a graphical user interface to facilitate specification of a desired data format, in accordance with aspects described herein.

Referring to FIG. 5, interface 500 includes a scan button 502 that a user can invoke to cause the program obtain bar code data. In one example, invoking scan button 502 causes the program to accept bar code data from an indicia reading apparatus, i.e. the indicia reading apparatus scans a bar code and provides the bar code data to the program. The graphical user interface 500 displays this as bar code data 504. Additionally, the actual bar code from which that bar code data was extracted can be recreated and displayed, in this example, in interface 500 as source bar code 506. Alternatively or additionally, in some embodiments, instead of using a scan button of the interface, a user simply scans a bar code using the indicia reading apparatus and the bar code data is automatically provided and displayed in interface 500 as depicted, absent requiring the user to select a scan button. In yet other embodiments, the user is prompted by the program to scan a bar code, for instance when the program is launched. In any case, in the example of FIG. 5, the bar code data is (without the quotes): "1234567890ABCDEFGHIJ".

In the example of FIG. 5, the bar code data 504 is displayed using the ASCII character set, though in other embodiments, the bar code data could be displayed using another character set.

Interface 500 also includes a model identifier selection interface 508, which in this example is implemented as a pull-down menu. The menu can list any number of indicia reading apparatus models. The user selects from this menu the model of the apparatus(es) the user wishes to configure. This, this selection identifies for the program the particular type of apparatus being configured, which may or may not be the same type as the indicia reading apparatus from which the bar code data 504 was obtained. This information is useful because it is used to identify for the program the types of bar codes that can be scanned by the terminal being configured (and hence how many characters of data might from a single scan interface 500 must be able to handle and display as bar code data 504).

The model selection can also be used to identify which commands the terminal is able to recognize out of a larger set of commands. The valid commands to configure one terminal may differ from the valid commands to configure another terminal. Identification of the terminal being configured can serve as an indication to narrow the possible commands that can be sent to the terminal to configure the terminal to present data in the desired data format.

The displayed bar code data 504 is displayed in the data format in which it is received from the terminal. This may not be the data format that the user desires a terminal to use when outputting bar code data. Therefore, interface 500 provides a user input field 510. The user input field enables the user to input a representation of the desired format in which the bar code data (504) should be output by the terminal being configured. The user input field 510 therefore enables the user to specify the desired data format. Based on the user input to the user input field, the representation of the desired data format 504 is populated into the user input field 510, and that representation is used to determine, automatically by a program in some embodiments, configuration settings that will configure the terminal to output bar code data in the desired format. The user's ability to specify the desired data format includes, in some embodiments, the ability to select, drag, and then drop portion(s) of bar code data 504 into user input field 510. This can indicate to the program that corresponding portions of decoded bar code data are to be used when formatting that data in the desired data format.

By way of specific example as provided in FIG. 5, the user desires to format the bar code data as follows: Skip the first two characters (1 and 2 in this example), insert three asterisks (*), send the next four characters (3456), insert a hash (#), send all characters up to the "D" (7890ABC), insert a space (' '), then send the rest of the characters (DEFGHIJ), followed by a carriage return control character ([CR] in ASCII).

The user can specify the above by, in part, selecting portions of bar code data 504 and copying it into user input field 510, for instance by dragging it and dropping it into user input field 510, of invoking another copy and paste operation, such as Ctrl-C and Ctrl-V keyboard combinations. The user is also permitted to position a cursor and type within user input field 510, to specify static characters for instance. To specify the above, then, the user might input the following (and in the following order) into user input field 510: Type three asterisks, drag and drop the "3456" portion of bar code data 504 into user input field 510, type a hash character, drag and drop the "7890ABC" portion of bar code data 504, type a space character, drag and drop the remainder of bar code data 504, then input a carriage return control character. The representation of the desired data format (512) is populated in user input field 510 as the user inputs the above.

Non-printable control characters, sometimes used as field separators, are valid characters in many character sets. For inputting control characters, a control character selection interface 514 is provided. The control character selection interface enables a user to input a control character by selecting the control character from the control character selection interface 514, which in the example of FIG. 5 is a pull down menu. Selection of a control character from that menu will input the control character into the user input field 510 (inserting an indication of that control character) at the position of the cursor in that field, in one example. In another example, the user can drag a control character from the list and drop it into user input field at the desired location. In FIG. 5, the carriage return control character is indicated by [CR].

In some embodiments, control character selection interface 514 also includes any other desired characters of the character set being used (ASCII in this example), for instance characters that are lesser known or used, or for which the keypress combination to insert the control character is unknown to the user.

The data in user input field 510 (i.e. representation 512) is a representation of the data format in that it indicates the desired data format by way of the specific example of the source bar code data 504. By dragging and dropping the third, fourth, fifth, and sixth characters of that data, but not including the leading two characters, the user is indicating that the first two characters are to be dropped (unless dragged and dropped at some position after the "3456"), while the third, fourth, fifth, and sixth characters are to be provided. In this sense, the 3, 4, 5, and 6 that are dropped into user input field 510 are merely variables indicating the third, fourth, fifth, and sixth characters of whatever the source bar code (504) happens to be; they are merely representative of the data in the third, fourth, fifth, and sixth position. In one embodiment, if the user wanted "3456" to be static (always be the third, fourth, fifth, and sixth characters in the desired data format), then the user manually types these characters into user input field 510, or selects them from a selection interface similar to interface 514 as examples.

Accordingly, the user is enabled to specify, in any order the user wishes, the desired data format, including the addition/removal/rearrangement of any character(s) of the bar code data or character set. The user input field is populated with the representation of the desired data format, and the program will determine configuration settings from the standard data formatting commands supported by the indicated terminal, to configure the terminal to manipulate the data as desired by the customer. Once the configuration settings are determined, they can be provided to a terminal to configure the terminal to output subsequent bar code data in the desired format.

In determining the configuration settings, the program can infer that since the first and second characters were not included in the representation 512, they are to be dropped. The program would then identify the command(s) to drop those characters. In determining some configuration settings, the user can be prompted if the program is unable to determine which particular rule (setting) to apply for an input user action. For instance, when the user drags and drops the "7890ABC" into user input field 510, the program might prompt the user to specify whether this is a 'selection of the next 7 characters' or, instead, whether this is a selection of 'characters until a "D" is reached'. In one embodiment, the program presents the user with an interface for selecting from these two possibilities based on matching those two functions as being possible configuration settings available to that particular model of terminal. The user can then specify that the selection ended at "C" because a "D" was reached, in this example. Similarly, after copying the "DEFGHIJ" characters, the program can prompt the user to specify whether this is to signify 'output of the next 7 characters' or whether it is to signify 'output the remaining characters'.

A specific set of example commands for programming an indicia reading apparatus is found in "Xenon 1900/1910, Xenon 1902/1912, Granit 1910i/1911i—User's Guide," published by Honeywell Scanning & Mobility (available at http://www.honeywellaide.com/CatalogDocuments/Xenon-UG%20Rev %20g.pdf) which is hereby incorporated herein by reference in its entirety. Using the above example, then, the program might determine that the proper configuration settings for sending to the apparatus to configure it to present data in the desired data format are: "0 999 6A 999 F5 02 F4 2A 03 F2 04 23 F3 44 20 F1 0D SAVE".

Some configuration settings enable more complex data formatting to be performed, such as dropping the last n characters, searching for strings, and possibly changing characters to other characters, as examples, and aspects described herein can account for this. For instance, a complex function selection interface (not depicted) could be provided for the user to select a function, such as a 'Search for Regular Expression' function, and specify, e.g., the regular expression to search for (either by typing or by highlighting a string in bar code data 504). The user can then input what is to be done to that string. For instance, the user might input a specific static string that is always to replace the search string, or the user could highlight in bar code 504 the string that is to replace the search string. In other examples, the user could indicate that the string be reversed in the desired data output.

Once the user has specified the desired data format, the user can select a test button/control 516. In one embodiment, this invokes the sending of the configuration settings (e.g. commands) to the terminal to be applied, in order to configure the terminal. Error checking can also be implemented to ensure that the user is conforming to the available commands for that identified model. If a particular model does not have a command to perform a particular complex function, that complex function may not be made available for the user. The terminal then provides the bar code data (504) again, either by scanning the original bar code again, or by reading-out a preserved version of the bar code data from a buffer. The provided bar code data will be, assuming everything was a success, formatted according to the configuration settings that were just applied to the terminal. In other words, the formatted version of that bar code, as the format was applied by way of the configuration settings to the terminal, can be sent by the terminal and displayed in a test format field 518 of interface 500 so that the user can verify whether the terminal is configured to properly provide the bar code data in the desired data format.

Additionally or alternatively, the test button 516 or other control of interface 500 could enable a user to scan one or more other bar codes, to verify that the proper data format is being correctly applied in the general case across multiple different bar codes, rather than just the specific case of the source bar code (506) that was used in specifying the desired data format.

Interface 500 also provides a save button/control 520 for saving the particular configuration settings. This can be especially useful when it is desired to configure multiple terminals of a same or similar model, in which the configuration settings to be applied are the same across all of the terminals. When the save button 520 is invoked, it can save the determined configuration settings in any desired format. For instance, they can be saved as an .EXM digital file, which can be provided to and opened by a terminal to cause the terminal to be configured with the configuration settings specified in the .EXM file. Additionally or alternatively, the configuration settings can be encoded in an encoded mark, such as a two-dimensional "configuration bar code" for configuring a terminal that scans the bar code. This configuration bar code could specify all the formatting routines required to configure the terminal to format the bar code to the desired output. In this manner, the configuration bar code can be scanned to quickly auto-configure terminals with the proper configuration settings. In some examples, the configuration bar code is saved in a .PDF or .DOC digital file. In another example, the configuration bar code is printed to a printing device by selecting print configuration bar code button/control 522. On the printed configuration sheet, the user can make comments, name the configuration for convenience, etc.

Figure 6:
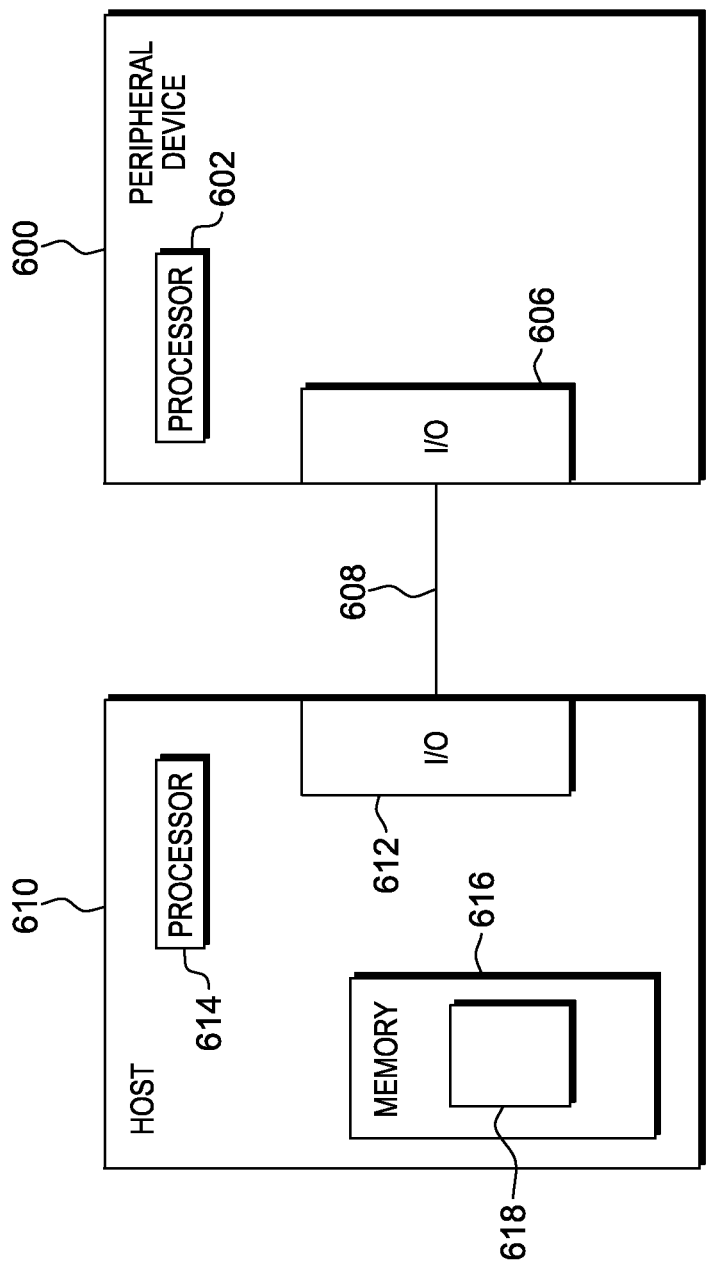
FIG. 6 depicts one example of a data processing system in communication with a peripheral device, in accordance with aspects described herein.

In one example, when a user wishes to configure one or more terminals, the user couples a terminal to a data processing system executing the graphical user interface application. FIG. 6 depicts one example of a data processing system in communication with a peripheral device, in accordance with aspects described herein. In FIG. 6, peripheral device 600 is an indicia reading apparatus that communicates with a host data processing system 610 across communications link 608. Communications link can be any appropriate wired or wireless communication channel that supports analog or digital communication of data between peripheral device 600 and host 610. A non-limiting list of example communication links includes Universal Serial Bus, Wi-Fi™, and Bluetooth™ connections.

Host 610 includes processor 614 (such as a CPU) and memory 616. Memory 616 can include one or more volatile or non-volatile memories of one or more types, such as random access memory, read only memory, or any other type of storage memory, such as a hard disk drive. In one example, memory 616 stores program code (instructions) for execution by processor 614 to perform one or more aspects described herein. For instance, host 610 executes program code 618 to provide a program presenting a graphical user interface as described herein for facilitating specification of a desired data format for bar code data to be presented to an indicia reading apparatus. Host also includes I/O component(s) 612. I/O components 612 include one or more physical interfaces for communicating data to/from peripheral device 600. These interfaces comprise one or more hardware components. In the example of a Universal Serial Bus communications link, a supporting physical interface comprises a Universal Serial Bus port, as an example.

Peripheral device 600 is, in one example, an indicia reading apparatus as described above. Indicia reading device 600 can be operative to output bar code data. Processor 602 can be adapted to perform various algorithms (by way of executing code) including algorithms supporting bar code data formatting and communication of bar code data across communications link 608 via one or more I/O component(s) 606.

Thus, a user can couple indicia reading apparatus 600 to host 610 in order to facilitate specification of a desired data format for bar code data. The user can use indicia reading apparatus 600 to input, to a program executing on host 610 and providing a graphical user interface described above, a source bar code. The user can use the source bar code as it is displayed in the interface in specifying a desired data format. The user can then test whether configuration settings determined by the program are accurate by committing the configuration settings to indicia reading apparatus 600. Additionally, the configuration settings can be saved and/or printed and then used to configure other indicia reading apparatuses (not pictured) to format bar code data according to the desired data format. As an example, the configuration settings can be provided to other indicia reading apparatuses, perhaps remote and not in communication with host 610, to configure the other apparatuses. The configured other apparatuses are thereby configured to provide bar code data in the desired data format to whatever components those other apparatuses are connected.

In other embodiments, the graphical user interface application executes directly on an indicia reading apparatus itself, and is presented on a display thereof to a user. The user can configure the desired data format as described above and save the configuration to the indicia reading apparatus.

Accordingly, processes for facilitating specification of a desired data format are described herein. In one example, a graphical user interface is provided for facilitating specification, by a user, of a desired data format for bar code data to be presented by an indicia reading apparatus. An example such process is described and depicted with reference to FIG. 7.

The process begins by obtaining and displaying bar code data decoded from an image of a bar code (702). As described above, in one example, an indicia reading apparatus scans and decodes a bar code, and then provides the bar code data to a program executing and providing the graphical user interface for display to the user. In other examples, this bar code data may have been already stored locally or remotely and obtained from storage when a user wishes to specify a desired data format.

A user input field is provided to the user (704) to enable specification of the desired data format. Based on input by the user to the user input field, the user input field is populated with a representation of the desired data format for the bar code data. In some examples, the representation includes at least a portion of the displayed (source) bar code data. In particular examples, the input by the user includes dragging and dropping at least a portion of the displayed bar code data into the user input field. Additionally or alternatively, the graphical user interface includes a control character selection interface for selection of control character(s), and the input by the user includes selection of a control character from the control character selection interface. Based on selection of that control character, the control character is input into the user input field.

Next, based on the representation of the desired data format populated in the input field, one or more configuration settings are determined (706), and in one example are determined automatically by a processor, for configuring an indicia reading apparatus to output bar code data in the desired data format. The configuration settings can include commands that, when provided to the indicia reading apparatus, configure the indicia reading apparatus to provide bar code data in the desired data format. Additionally, the available configuration settings could be selected from a plurality of predefined configuration settings available for the indicia reading apparatus. The user can select a model identifier that identifies a model of the indicia reading apparatus that the user desired to configure to provide the desired data format. That selection can be used to identify a plurality of configuration settings that are available (e.g. valid) for that particular model indicia reading apparatus.

Figure 7:
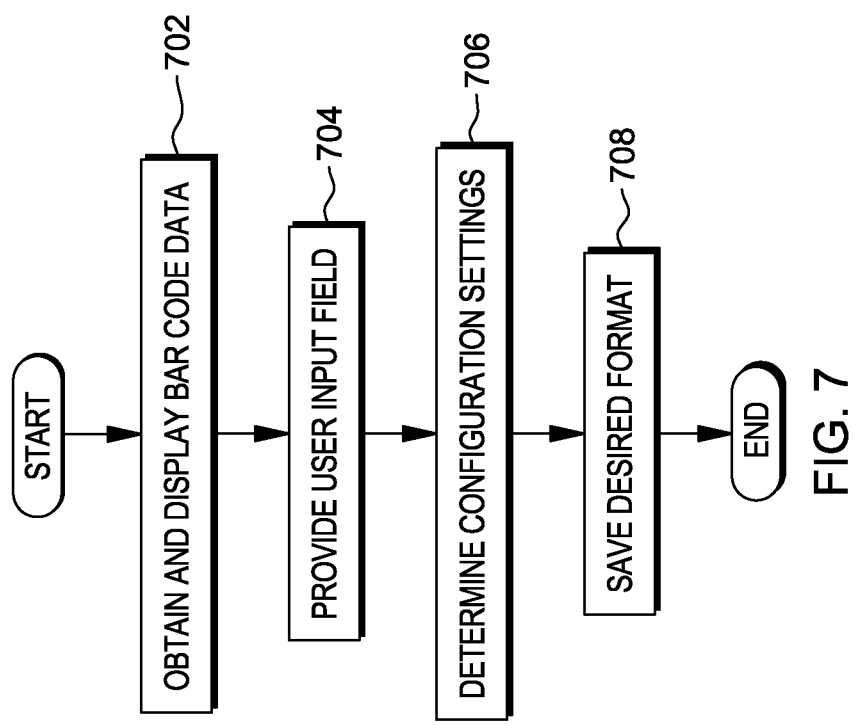
FIG. 7 depicts an example process for facilitating specification of a desired data format, in accordance with aspects described herein.

The method of FIG. 7 continues by saving the desired format (708). That is, an indication of the configuration settings for configuring an indicia reading apparatus to provide bar code data in that desired data format can be saved, e.g. as command(s) indicated by a configuration bar code or a digital file, as examples. In some embodiments, the saved configuration settings can be provided to an indicia reading apparatus by scanning the configuration bar code using the indicia reading apparatus, or by providing the digital file to the indicia reading apparatus.

Provision of the configuration settings to an indicia reading apparatus configures the indicia reading apparatus to output bar code data in the desired data format. In one example, the configuration settings are provided to an indicia reading apparatus to test whether the configuration settings are proper, i.e. whether the indicia reading apparatus is properly configured to output bar code data in the desired data. The interface can, therefore, provide a control that, when selected, will cause the interface to receive bar code data from the indicia reading apparatus, and assuming the configuration settings are proper, the received bar code data will be in the desired data format based on configuring the indicia reading apparatus with those configuration settings.

Aspects described herein address difficulties encountered when a user wishes to configure an indicia reading apparatus to provide data in accordance with a desired data format. More specifically, aspects described herein enable ease of configuration and reduction in the time spent configuring an indicia reading apparatus. This can help minimize the volume of technical support requests, freeing those resources for other uses, while enhancing usability users themselves and other stakeholders by providing an efficient and convenient facility for formatting data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Referring now to FIG. 8, in one example, a computer program product 800 includes, for instance, one or more computer readable media 802 to store computer readable program code means or logic 804 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A small sample of methods that are described herein is as follows:

A1. A method including: providing a graphical user interface, the graphical user interface facilitating specification, by a user, of a desired data format for bar code data to be presented by an indicia reading apparatus, the providing including: obtaining and displaying bar code data, the bar code data decoded from an image of a bar code; providing a user input field, wherein based on input by the user to the user input field, the user input field is populated with a representation of the desired data format for the bar code data, wherein the representation includes at least a portion of the displayed bar code data; and based on the representation of the desired data format populated in the user input field, determining, by a processor, one or more configuration settings for configuring the indicia reading apparatus to present bar code data in the desired data format.

A2. The method of A1, wherein the input by the user includes dragging and dropping at least a portion of the displayed bar code data into the user input field.

A3. The method of A1, wherein the provided graphical user interface further includes a control character selection interface for selection of one or more control characters, wherein the input by the user includes selection of a control character from the control character selection interface, and wherein the selected control character is input into the user input field based on the selection of the control character by the user.

A4. The method of A1, wherein determining the one or more configuration settings includes determining one or more commands that, based on provision of the one or more commands to the indicia reading apparatus, configure the indicia reading apparatus to output bar code data in the desired data format.

A5. The method of A4, wherein the determined one or more commands are selected from a plurality of predefined commands available for the indicia reading apparatus.

A6. The method of A1, wherein the provided graphical user interface further includes an interface for selection of a model identifier, the model identifier identifying a model of the indicia reading apparatus, and wherein the determined one or more configuration settings are selected from a plurality of available configuration settings determined based on the model identified by the selected model identifier.

A7. The method of A1, further including providing the one or more configuration settings to the indicia reading apparatus, wherein the providing configures the indicia reading apparatus to output bar code data in the desired data format.

A8. The method A7, wherein the method further includes saving an indication of the configuration settings as at least one of a configuration bar code or a digital file, and wherein providing the one or more configuration settings to the indicia reading apparatus includes scanning the configuration bar code using the indicia reading apparatus or providing the digital file to the indicia reading apparatus.

A9. The method of A7, wherein the provided graphical user interface further includes a control for selection by the user to test whether the indicia reading apparatus is configured to output bar code data in the desired data format, wherein, based on selection of the control, the method further includes receiving bar code data from the indicia reading apparatus, wherein the received bar code data is in the desired data format based on configuring the indicia reading apparatus with the one or more configuration settings.

A10. A system including: a memory; and a processor in communications with the memory, wherein the system is configured to perform a method including: providing a graphical user interface, the graphical user interface facilitating specification, by a user, of a desired data format for bar code data to be presented by an indicia reading apparatus, the providing including: obtaining and displaying bar code data, the bar code data decoded from an image of a bar code; providing a user input field, wherein based on input by the user to the user input field, the user input field is populated with a representation of the desired data format for the bar code data, wherein the representation includes at least a portion of the displayed bar code data; and based on the representation of the desired data format populated in the user input field, determining one or more configuration settings for configuring the indicia reading apparatus to present bar code data in the desired data format.

A12. The system of A10, wherein the input by the user includes dragging and dropping at least a portion of the displayed bar code data into the user input field.

A12. The system of A10, wherein determining the one or more configuration settings includes determining one or more commands that, based on provision of the one or more commands to the indicia reading apparatus, configure the indicia reading apparatus to output bar code data in the desired data format.

A13. The system of A10, wherein the provided graphical user interface further includes an interface for selection of a model identifier, the model identifier identifying a model of the indicia reading apparatus, and wherein the determined one or more configuration settings are selected from a plurality of available configuration settings determined based on the model identified by the selected model identifier.

A14. The system of A10, wherein the method further including providing the one or more configuration settings to the indicia reading apparatus, wherein the providing configures the indicia reading apparatus to output bar code data in the desired data format.

A15. The system of A14, wherein the provided graphical user interface further includes a control for selection by the user to test whether the indicia reading apparatus is configured to output bar code data in the desired data format, wherein, based on selection of the control, the method further includes receiving bar code data from the indicia reading apparatus, wherein the received bar code data is in the desired data format based on configuring the indicia reading apparatus with the one or more configuration settings.

A16. A computer program product including: a tangible storage medium storing program instructions readable by a processor for execution to perform a method including: providing a graphical user interface, the graphical user interface facilitating specification, by a user, of a desired data format for bar code data to be presented by an indicia reading apparatus, the providing including: obtaining and displaying bar code data, the bar code data decoded from an image of a bar code; providing a user input field, wherein based on input by the user to the user input field, the user input field is populated with a representation of the desired data format for the bar code data, wherein the representation includes at least a portion of the displayed bar code data; and based on the representation of the desired data format populated in the user input field, determining one or more configuration settings for configuring the indicia reading apparatus to present bar code data in the desired data format.

A17. The computer program product of A16, wherein the input by the user includes dragging and dropping at least a portion of the displayed bar code data into the user input field.

A18. The computer program product of A16, wherein determining the one or more configuration settings includes determining one or more commands which, based on provision of the one or more commands to the indicia reading apparatus, configure the indicia reading apparatus to output bar code data in the desired data format.

A19. The computer program product of A16, wherein the provided graphical user interface further includes an interface for selection of a model identifier, the model identifier identifying a model of the indicia reading apparatus, and wherein the determined one or more configuration settings are selected from a plurality of available configuration settings determined based on the model identified by the selected model identifier.

A20. The computer program product of A16, wherein the method further including providing the one or more configuration settings to the indicia reading apparatus, wherein the providing configures the indicia reading apparatus to output bar code data in the desired data format, and wherein the provided graphical user interface further includes a control for selection by the user to test whether the indicia reading apparatus is configured to output bar code data in the desired data format, wherein, based on selection of the control, the method further includes receiving bar code data from the indicia reading apparatus, and wherein the received bar code data is in the desired data format based on configuring the indicia reading apparatus with the one or more configuration settings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
providing a graphical user interface, the graphical user interface facilitating specification, by a user, of a desired data format for bar code data to be presented by an indicia reading apparatus, the providing comprising:
obtaining and displaying bar code data, the bar code data decoded from an image of a bar code;
providing a user input field, wherein based on input by the user to the user input field, the user input field is populated with a representation of the bar code data in the desired data format, wherein the representation comprises at least a portion of the displayed bar code data; and
based on the representation of the bar code data in the desired data format populated in the user input field, determining, by a processor, one or more configuration settings for configuring the indicia reading apparatus to present bar code data in the desired data format;
wherein the input by the user comprises dragging and dropping at least one character from the displayed bar code data into the user input field, wherein the dropped at least one character indicates a variable character input within the desired data format.

2. The method of claim 1, wherein the provided graphical user interface further comprises a control character selection interface for selection of one or more control characters, wherein the input by the user comprises selection of a control character from the control character selection interface, and wherein the selected control character is input into the user input field based on the selection of the control character by the user.

3. The method of claim 1, wherein determining the one or more configuration settings comprises determining one or more commands that, based on provision of the one or more commands to the indicia reading apparatus, configure the indicia reading apparatus to output bar code data in the desired data format.

4. The method of claim 3, wherein the determined one or more commands are selected from a plurality of predefined commands available for the indicia reading apparatus.

5. The method of claim 1, wherein the provided graphical user interface further comprises an interface for selection of a model identifier, the model identifier identifying a model of the indicia reading apparatus, and wherein the determined one or more configuration settings are selected from a plurality of available configuration settings determined based on the model identified by the selected model identifier.

6. The method of claim 1, further comprising providing the one or more configuration settings to the indicia reading apparatus, wherein the providing configures the indicia reading apparatus to output bar code data in the desired data format.

7. The method claim 6, wherein the method further comprises saving an indication of the configuration settings as at least one of a configuration bar code or a digital file, and wherein providing the one or more configuration settings to the indicia reading apparatus comprises scanning the configuration bar code using the indicia reading apparatus or providing the digital file to the indicia reading apparatus.

8. The method of claim 6, wherein the provided graphical user interface further comprises a control for selection by the user to test whether the indicia reading apparatus is configured to output bar code data in the desired data format, wherein, based on selection of the control, the method further comprises receiving bar code data from the indicia reading apparatus, wherein the received bar code data is in the desired data format based on configuring the indicia reading apparatus with the one or more configuration settings.

9. A system comprising:
a memory; and
a processor in communications with the memory, wherein the system is configured to perform a method comprising:
providing a graphical user interface, the graphical user interface facilitating specification, by a user, of a desired data format for bar code data to be presented by an indicia reading apparatus, the providing comprising:
obtaining and displaying bar code data, the bar code data decoded from an image of a bar code;
providing a user input field, wherein based on input by the user to the user input field, the user input field is populated with a representation of the bar code data in the desired data format, wherein the representation comprises at least a portion of the displayed bar code data; and
based on the representation of the bar code data in the desired data format populated in the user input field, determining one or more configuration settings for configuring the indicia reading apparatus to present bar code data in the desired data format;
wherein the input by the user comprises dragging and dropping at least one character from the displayed bar code data into the user input field, wherein the dropped at least one character indicates a variable character input within the desired data format.

10. The system of claim 9, wherein determining the one or more configuration settings comprises determining one or more commands that, based on provision of the one or more commands to the indicia reading apparatus, configure the indicia reading apparatus to output bar code data in the desired data format.

11. The system of claim 9, wherein the provided graphical user interface further comprises an interface for selection of a model identifier, the model identifier identifying a model of the indicia reading apparatus, and wherein the determined one or more configuration settings are selected from a plurality of available configuration settings determined based on the model identified by the selected model identifier.

12. The system of claim 9, wherein the method further comprising providing the one or more configuration settings to the indicia reading apparatus, wherein the providing configures the indicia reading apparatus to output bar code data in the desired data format.

13. The system of claim 12, wherein the provided graphical user interface further comprises a control for selection by the user to test whether the indicia reading apparatus is configured to output bar code data in the desired data format, wherein, based on selection of the control, the method further comprises receiving bar code data from the indicia reading apparatus, wherein the received bar code data is in the desired data format based on configuring the indicia reading apparatus with the one or more configuration settings.

14. A computer program product comprising:
a tangible storage medium storing program instructions readable by a processor for execution to perform a method comprising:
providing a graphical user interface, the graphical user interface facilitating specification, by a user, of a desired data format for bar code data to be presented by an indicia reading apparatus, the providing comprising:
obtaining and displaying bar code data, the bar code data decoded from an image of a bar code;

providing a user input field, wherein based on input by the user to the user input field, the user input field is populated with a representation of the bar code data in the desired data format, wherein the representation comprises at least a portion of the displayed bar code data; and based on the representation of the bar code data in the desired data format populated in the user input field, determining one or more configuration settings for configuring the indicia reading apparatus to present bar code data in the desired data format;

wherein the input by the user comprises dragging and dropping at least one character from the displayed bar code data into the user input field, wherein the dropped at least one character indicates a variable character input within the desired data format.

15. The computer program product of claim 14, wherein determining the one or more configuration settings comprises determining one or more commands which, based on provision of the one or more commands to the indicia reading apparatus, configure the indicia reading apparatus to output bar code data in the desired data format.

16. The computer program product of claim 14, wherein the provided graphical user interface further comprises an interface for selection of a model identifier, the model identifier identifying a model of the indicia reading apparatus, and wherein the determined one or more configuration settings are selected from a plurality of available configuration settings determined based on the model identified by the selected model identifier.

17. The computer program product of claim 14, wherein the method further comprising providing the one or more configuration settings to the indicia reading apparatus, wherein the providing configures the indicia reading apparatus to output bar code data in the desired data format, and wherein the provided graphical user interface further comprises a control for selection by the user to test whether the indicia reading apparatus is configured to output bar code data in the desired data format, wherein, based on selection of the control, the method further comprises receiving bar code data from the indicia reading apparatus, and wherein the received bar code data is in the desired data format based on configuring the indicia reading apparatus with the one or more configuration settings.

\* \* \* \* \*